(No Model.)
G. H. HEALEY.
LAST.
No. 399,227. Patented Mar. 5, 1889.
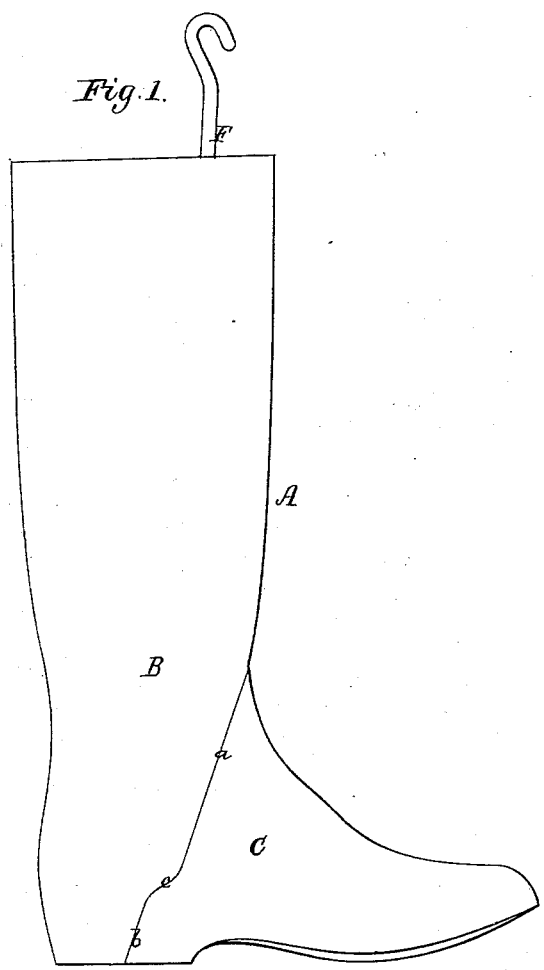
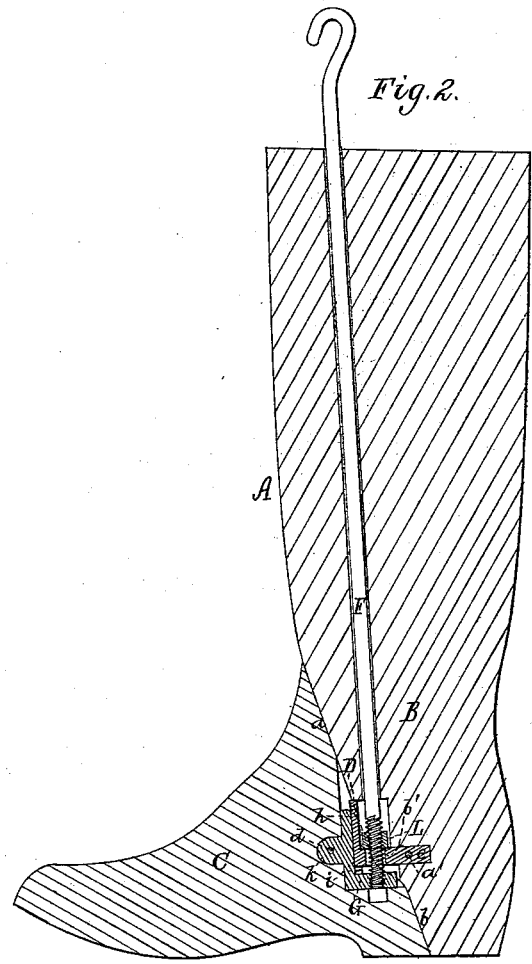
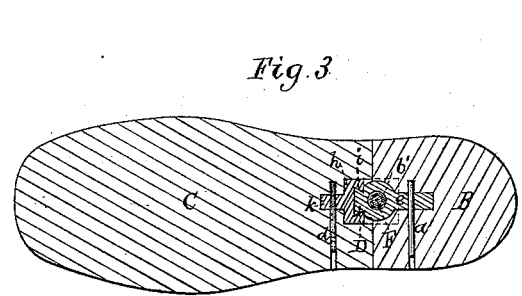
Witnesses
Inventor,
George H. Healey
by Singleton & Piper, att'ys

UNITED STATES PATENT OFFICE.

GEORGE H. HEALEY, OF STONEHAM, MASSACHUSETTS.

LAST.

SPECIFICATION forming part of Letters Patent No. 399,227, dated March 5, 1889.

Application filed October 6, 1888. Serial No. 287,354. (No model.)

*To all whom it may concern:*

Be it known that I, GEORGE H. HEALEY, a citizen of the United States, residing at Stoneham, in the county of Middlesex and State of Massachusetts, have invented certain new and useful Improvements in Lasts or Forms for Use in the Manufacture of Rubber Boots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side elevation, Fig. 2, a longitudinal and vertical section, and Fig. 3 a horizontal section, of a last or form for use in the manufacture of rubber boots provided with my invention.

The nature of my invention is set forth in the claim hereinafter presented.

In the drawings, the last or form is shown at A, it being formed in two portions or parts, B and C, as shown, the line of junction or the abutting surface of each part being composed of two inclines, $a$ and $b$, connected by an ogee curve, $c$. Said curved portions, when the parts of the last are connected together, as hereinafter described, bear against each other and serve to keep the two parts of the last in their due relation to each other and prevent transverse movement of the part C on the part B.

To the part B, I secure a dovetail, D, which is provided with a shank, $e$, through which a pin, $a'$, extends to secure it to the said part B. The shank is perforated at $b'$ to admit of the passage through it of a rod, F, screw-threaded at its lower end to screw into a female screw formed in a piece, G, which has extending upward from it a part, $h$, in which is a dovetailed groove, $i$, to receive the dovetail D when the parts of the last are together.

An ear, $k$, extends from the part $h$, and has a hole in it to receive a pin, $d$, to secure the piece G to the portion C of the last. A nut, L, arranged on the screw of the rod and in a chamber in the last, serves as a shoulder and brings up against the top of the shank $e$, when the screw has sufficiently entered the piece G, to securely fasten the portions of the last together. When the part B is separated from the part C by drawing the rod F so as to bring the nut L against the top of the chamber in which it is located and revolving the rod, the location of the nut on the screw can be increased or lessened in distance from the end of the said screw as may be required to cause the screw to enter the proper distance into the said piece G.

The improvement hereinbefore described facilitates the uniting of the parts of the last and results in the saving of much time over the means heretofore employed for the purpose.

Having described my invention, what I claim is—

In a last or form for boots, the part B, provided with the dovetail secured thereto, the rod F, screw-threaded at its lower end and provided with a nut or shoulder to bear on the shank of the dovetail through which the rod passes, the part C of the last provided with the dovetail-grooved piece G, secured thereto, in which is a female screw to receive the screw of the rod F to connect the parts of the last together, the abutting surfaces of said parts each being formed as represented, and all being substantially as shown and set forth.

In testimony whereof I affix my signature in presence of two witnesses.

GEORGE H. HEALEY.

Witnesses:
 GEO. M. GUILD,
 S. N. PIPER.